United States Patent [19]
Sato et al.

[11] Patent Number: 5,755,210
[45] Date of Patent: May 26, 1998

[54] FUEL DISCHARGE PREVENTIVE DEVICE OF GAS ENGINE

[75] Inventors: Toru Sato, Chita; Kazuhiro Yoneshige, Nagoya; Kazusato Kasuya, Kariya; Kichiro Kato, Shizuoka-ken; Masahiko Masubuchi, Susono, all of Japan

[73] Assignees: Aisan Kogyo Kabushiki Kaisha, Ohbu; Toyota Jidosha Kabushiki Kaisha, Toyota, both of Japan

[21] Appl. No.: 863,003

[22] Filed: May 23, 1997

[51] Int. Cl.$^6$ .................. F02M 33/02; F02B 43/00
[52] U.S. Cl. .................. 123/518; 123/519; 123/529
[58] Field of Search .................. 123/527, 529, 123/518, 519, 520, 521

[56] References Cited

U.S. PATENT DOCUMENTS

| | | | |
|---|---|---|---|
| 4,606,319 | 8/1986 | Silva | 123/527 |
| 4,721,078 | 1/1988 | Watanabe et al. | 123/529 |
| 5,357,935 | 10/1994 | Oxley et al. | 123/527 |
| 5,509,393 | 4/1996 | Leaf et al. | 123/529 |
| 5,522,369 | 6/1996 | Povinger | 123/527 |
| 5,540,208 | 7/1996 | Kikutani | 123/518 |
| 5,592,387 | 1/1997 | Shelef et al. | 123/527 |

FOREIGN PATENT DOCUMENTS 6-63845   9/1994   Japan.

*Primary Examiner*—Erick R. Solis
*Attorney, Agent, or Firm*—Cushman Darby & Cushman IP Group of Pillsbury Madison & Sutro LLP

[57] ABSTRACT

In a fuel discharge preventive device of a gas engine, in order to prevent high-pressure gaseous fuel remaining in a fuel distributing pipe when an engine is stopped, from leaking out of a gaseous fuel injection valve to be discharged to the open air, a fuel shut-off valve is provided in a fuel feed passage through which gaseous fuel is fed to the gaseous fuel injection valve, and a suction passage communicating with a gaseous fuel storing portion is branched off from the fuel feed passage between the gaseous fuel injection valve and the fuel shut-off valve, so that the gaseous fuel in a potion of the fuel feed passage located between the gaseous fuel injection valve and the fuel shut-off valve is stored in the gaseous fuel storing portion after the engine is stopped and hence the fuel shut-off valve is closed, while the stored fuel is purged to the engine when the engine is being operated.

3 Claims, 3 Drawing Sheets

FUEL DISCHARGE PREVENTIVE DEVICE OF GAS ENGINE

BACKGROUND OF THE INVENTION

This invention relates to a fuel discharge preventive device of a gas engine.

Heretofore, in an engine of the type that high-pressure gaseous fuel is fed through a gaseous fuel injection valve to an engine (Compressed Natural Gas engine), when the engine is stopped and hence the gaseous fuel injection valve is closed, a lot of gaseous fuel remaining in an intake pipe, an intake port of the engine and the like, such unburnt fuel being likely to be released to the open air through an air cleaner.

To cope with this, an example of the device for preventing such unburnt fuel from being released to the open air shown in FIG. 3 is disclosed in JP-U-6-63845, for example.

The gist of this device will be described by referring to FIG. 3.

Gaseous fuel from a cylinder bottle 100 charged with gaseous fuel is distributed to a fuel distributing pipe 104 via a fuel shut-off valve 101, the first regulator 102 and the second regulator 103, and is then injected through a gaseous fuel injection valve 106 into an intake manifold 107, the opening and closing of the gaseous fuel injection valve 106 being controlled by a control unit 105.

When an engine 108 is stopped and hence the gaseous fuel injection valve 106 is closed, the control unit 105 continuously outputs ignition signals for a predetermined time so that the gaseous fuel remaining in the intake pipe 107, the intake port of the engine and the like is fed to the engine to be burnt, thereby preventing the unburnt fuel from being released to the open air via an intake passage 109 and an air cleaner 110.

In the above conventional technology, the gaseous fuel which remains in the intake manifold 107, the intake port of the engine and the like immediately after the engine is stopped, is prevented from being released to the open air, but a large amount of high-pressure unburnt fuel still remains in the fuel distributing pipe 104 located upstream of the gaseous fuel injection valve 106. Further, it is difficult for the gaseous fuel injection valve 106 to have the structure capable of completely shutting off the high-pressure gaseous fuel. This gives rise to a problem that even after the continuous ignition is finished as described above, the residual fuel in the fuel distributing pipe 104 leaks out of the gaseous fuel injection valve 106 into the intake manifold 107 so as to be released to the open air via the intake passage 109 and the air cleaner 110.

SUMMARY OF THE INVENTION

It is therefore an object of the present invention to provide a device by which, after an engine is stopped and hence a gaseous fuel ignition valve is closed, unburnt fuel remaining in a fuel distributing pipe and the like located upstream of the gaseous fuel injection valve is prevented from being released to the open air.

To solve the above problem, the first invention recited in claim 1 is characterized by that a fuel shut-off valve is provided in a fuel feed passage through which gaseous fuel is fed to a gaseous fuel injection valve, and a suction passage is branched off from the fuel feed passage between the gaseous fuel injection valve and the fuel shut-off valve so as to communicate with a gaseous fuel storing portion, so that gaseous fuel in a portion of the fuel feed passage located between the gaseous fuel injection valve and the fuel shut-off valve is stored in the gaseous fuel storing portion when the fuel shut-off valve is closed, while the stored fuel is purged to an engine when the fuel shut-off valve is opened.

In the first invention, when the engine is stopped and hence the fuel shut-off valve is closed, the high-pressure gaseous fuel in that portion of the fuel feed passage located between the gaseous fuel injection valve and the fuel shut-off valve including the fuel distributing pipe, is stored in the gaseous fuel storing porion and the pressure in the fuel feed passage is reduced, thereby preventing the gaseous fuel from leaking out of the gaseous fuel injection valve into an intake manifold.

A second invention recited in claim 2 is characterized by comprising a fuel shut-off valve provided in a fuel feed passage through which gaseous fuel is fed to a gaseous fuel injection valve, a suction passage branched off from the fuel feed passage between the gaseous fuel injection valve and the fuel shut-off valve, a gaseous fuel storing portion provided at the other end of the suction passage, a first switch valve provided in the suction passage, a purge passage through which fuel in the gaseous fuel storing portion is purged to an engine, a second switch valve provided in the purge passage, and control means for controlling opening and closing of the fuel shut-off valve, the first switch valve and the second switch valve in connection with opening and closing of the fuel shut-off valve.

In the second invention, when the engine is stopped and hence the gaseous fuel injection valve is closed, the fuel shut-off valve is closed and the first switch valve is opened and, further, the second switch valve is closed according to the instructions from the control means. Therefore the high-pressure gaseous fuel in that portion of the fuel feed passage located between the gaseous fuel injection valve and the fuel shut-off valve including the fuel distributing pipe, is stored in the gaseous fuel storing portion via the suction passage and the pressure in the fuel feed passage is reduced, and accordingly the gaseous fuel is prevented from leaking out of the gaseous fuel injection valve into an intake manifold.

While the engine is being operated, the fuel shut-off valve is opened and the first switch valve is closed and, further, when performing the purging, the second switch valve is opened according to the instructions from the control means. Therefore gaseous fuel is fed to the gaseous fuel injection valve and, when performing the purging, the fuel stored in the gaseous fuel storing potion is purged to the engine via the purge passage.

The gaseous fuel storing portion may comprise a canister or a surge tank in the present invention.

If the gaseous fuel storing portion comprises a canister, gaseous fuel is absorbed in the absorbent of the canister, while if it comprises a surge tank, gaseous fuel is stored in the surge tank. Accordingly, it is possible to reduce the amount and pressure of gaseous fuel in the fuel feed passage, with the result that the desired object can be achieved.

DESCRIPTION OF THE PREFERRED EMBODIMENT

Figure 1:
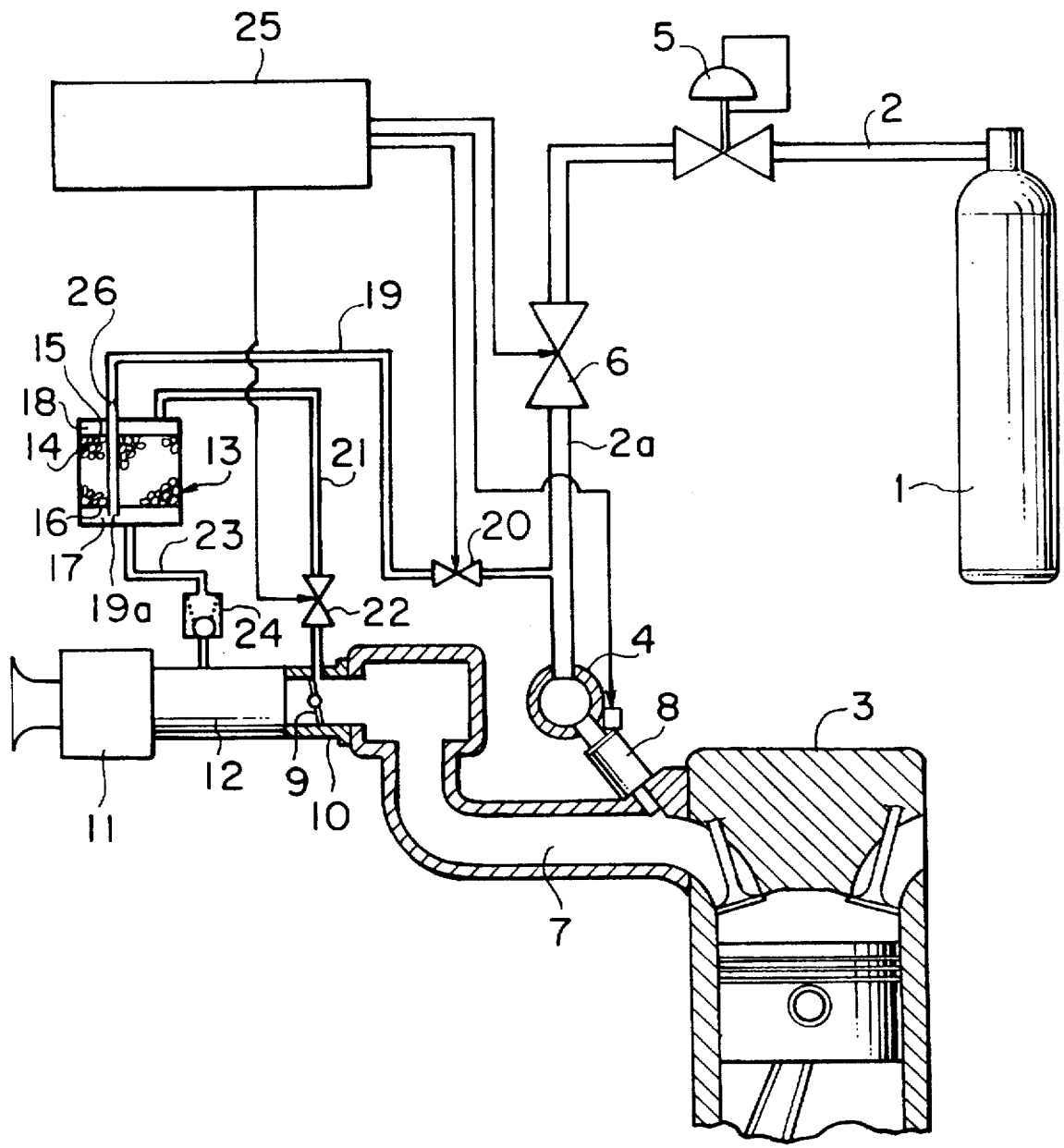
FIG. 1 is a diagrammatic view showing a fuel system according to the present invention.

Description will be given of a preferred embodiment of the present invention based on examples shown in FIGS. 1 and 2. FIG. 1 is a diagrammatic view of a fuel system.

Reference numeral 1 denotes a cylinder bottle charged with high-pressure gaseous fuel, which gaseous fuel in the cylinder bottle 1 is to be fed through a fuel feed passage 2 to a fuel distributing pipe 4 of a gas engine 3. The fuel feed passage 2 is provided with a regulator 5 in an upstream position thereof and a fuel shut-off valve 6 in a downstream position thereof, the fuel shut-off valve 6 being a solenoid valve.

Each intake manifold 7 of the gas engine 3 is provided with a gaseous fuel injection valve 8 which is operated to open and close so as to allow the high-pressure gaseous fuel fed to the fuel distributing pipe 4 to be fed by injection into the intake manifold 7 and to stop the same from being fed.

A throttle body 10 having a throttle valve 9 integrated therein is connected to an upstream end of the intake manifold 7, and an intake pipe 12 communicating with an air cleaner 11 is further connected to an upstream end of the throttle body 10.

Reference numeral 13 denotes a canister forming a gaseous fuel storing portion, in which absorbent such as activated carbon is contained and a suction chamber 17 and a purge chamber 18 are defined below and above the layers of absorbent 14 by means of filters 15, 16, respectively.

A suction passage 19 is branched off from the fuel feed passage 2a between the fuel distributing pipe 4 and the fuel shut-off valve 6 so that an end 19a of the suction passage 19 opens to and communicates with the suction chamber 17 in the canister 13. Further, the suction passage 19 is provided with the first switch valve 20 by which the suction passage 19 is opened and closed, the first switch valve 20 being a solenoid valve.

A purge passage 21 opens to and communicates with the purge chamber 18 of the canister 13 at one end and at another end opens to and communicates with the throttle body 10 at a position located downstream of the throttle valve 9. Further, the purge passage 21 is provided with the second switch valve 22 by which the purge passage 21 is opened and closed, the second switch valve 22 being a solenoid valve.

An air induction passage 23 opens to and communicates with the suction chamber 17 of the canister 13 at one end and at another end opens to and communicates with the intake pipe 12. Further, the air induction passage 23 is provided with a check valve 24 which allows the air to flow from the intake pipe 12 into the canister 13 but prevents the air from flowing backward.

Reference numeral 25 denotes a control unit (ECU) which is the control means and which starts controlling the operation when an ignition switch (not shown) is turned on and an instruction is input for stopping the engine operation when the ignition switch is turned off. The control unit 25 controls the opening and closing of the fuel shut-off valve 6, the gaseous fuel injection valve 8, the first switch valve 20, and the second switch valve 22 independently, in such a manner as to be described below.

Now, operation of this embodiment will be described.

When the ignition switch is turned on and hence the engine is being operated, according to the instructions from the control unit 25, the fuel shut-off valve 6 and the gaseous fuel injection valve 8 are opened so that the gaseous fuel injected through the gaseous fuel injection valve 8 and the air taken from the intake pipe 12 are mixed to be fed to the engine 3. Incidentally, during this operation, the first switch valve 20 is closed, while the second switch valve 22 is opened when performing the purging, according to the instructions from the control unit 25. Further, the check valve 24 is closed but, when the second switch valve 22 is opened and a negative pressure of not less than a predetermined value works on, it is opened so as to perform the purging.

When the ignition switch is turned off to stop the engine operation, the control unit 25 detects the off state of the ignition switch and hence detects that the operation is stopped. Then, the control unit 25 outputs valve-closing signals to the fuel shut-off valve 6 and the gaseous fuel injection valve 8 so as to make the both of them close. Therefore, the gaseous fuel is stopped from being fed to the fuel distributing pipe 4 and the injection of fuel through the gaseous fuel injection valve 8 is stopped as well.

Further, after the lapse of a predetermined delay time since the operation is stopped, the control unit 25 stops outputting the ignition signal to an ignition plug (not shown). Namely, ignition is continued for a predetermined period from the time the gaseous fuel injection valve 8 is closed. This causes unburnt fuel remaining in the intake manifold 7, intake port of the engine and the like to be fed to the engine to be burnt.

Meanwhile, when the control unit 25 detects that the engine is stopped from operating, that is, when the fuel shut-off valve 6 is closed, the control unit 25 outputs a valve-opening signal to the first switch valve 20 so as to make it open and, at the same time, outputs a valve-closing signal to the second switch valve 22 so as to make it close. Therefore, the high-pressure gaseous fuel remaining in the fuel distributing pipe 4 and the fuel feed passage 2a disposed between the fuel shut-off valve 6 and the gaseous fuel injection valve 8 is caused to pass through the suction passage 19 so as to be introduced from the end 19a into the suction chamber 17 of the canister 13, which gaseous fuel further flows into the absorbent layers 14 through the lower filter 16 so as to be absorbed and captured by the absorbent 14. This causes the amount and pressure of the gaseous fuel in the fuel feed passage 2a and the fuel distributing pipe 4 to decrease. In consequence, the high-pressure gaseous fuel in the fuel distributing pipe 4 and the fuel feed passage 2a can be prevented from leaking out of the gaseous fuel injection valve 8 to flow into the intake manifold 7 and hence prevented from being discharged through the air cleaner 11 to the open air (the outside of the car).

Further, the check valve 24 is held in its closed state by virtue of its spring force so that the fuel captured in the canister 13 is prevented from leaking out of the induction passage 23 to the air cleaner 11.

When the ignition switch is turned on and hence the engine is operated, the control unit 25 detects that the engine is operated and thus outputs valve-opening signals to the fuel shut-off valve 6 and the gaseous fuel injection valve 8, so that both of the valves 6, 8 are opened to allow the gaseous fuel to be fed to the engine 3. Simultaneously with this operation, the control unit 25 outputs a valve-closing signal to the first switch valve 20 so as to make it close and, when performing the purging, the control unit 25 outputs a valve-opening signal to the second switch valve 22 so as to make it open.

As a result, a negative pressure generated downstream of the throttle valve 9 due to operation of the engine 3 works on the inside of the purge chamber 18 of the canister 13 through the purge passage 21. Therefore, the negative pressure causes the check valve 24 to open so that air is introduced from the intake pipe 12 into the suction chamber 17 of the canister 13 from which the air flows through the absorbent layers 14 so as to be drawn into the purge passage 21. In consequence, the fuel absorbed and captured by the absorbent 14 as described above is released and discharged with the air flow and allowed to pass through the purge passage 21 so as to be purged from the throttle body 10 to the engine 3. Owing to this purging, the gaseous fuel thus purged can be used as engine driving fuel, and therefore the fuel consumption can be improved.

Figure 2:
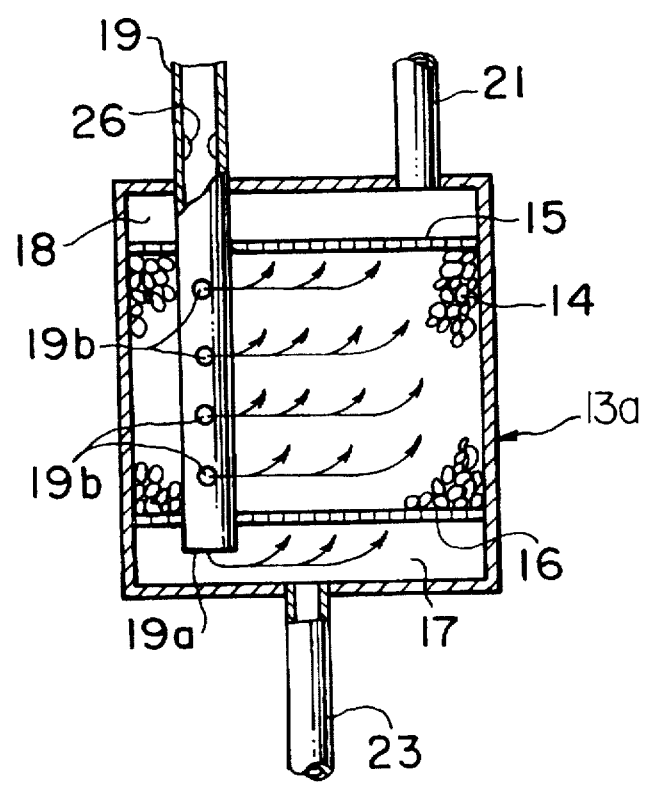
FIG. 2 is a sectional view showing another example of a canister which is used in the embodiment of FIG. 1.
Figure 3:
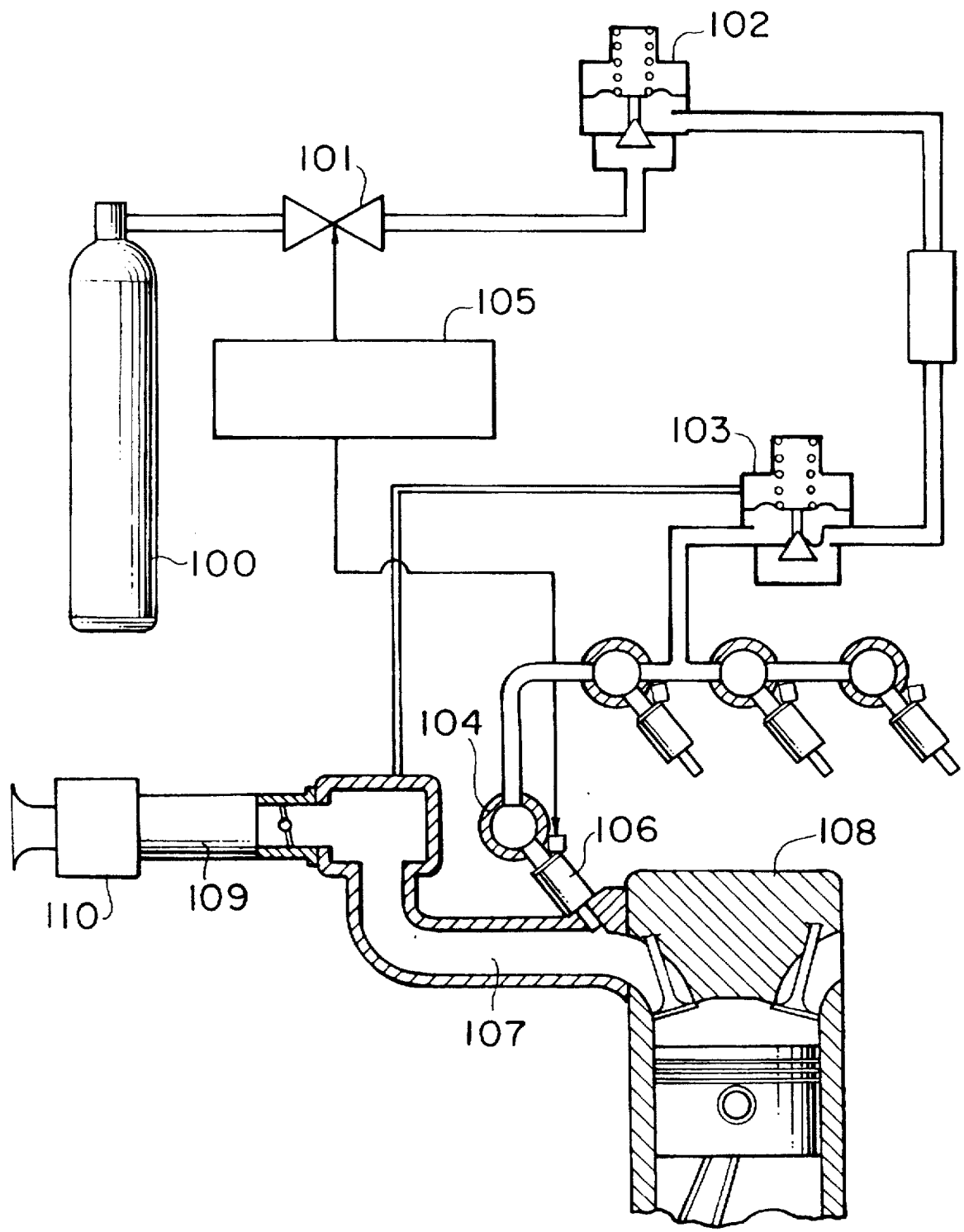
FIG. 3 is a diagrammatic view showing a fuel system of the prior art.

FIG. 2 shows another example of the canister 13.

In this example, a canister 13a is made in such a manner that a plurality of outlet holes 19b are provided in a portion of the suction passage 19, which penetrates through the layers of absorbent 14 in the canister, and the outlet holes 19b are properly spaced in the axial direction. In the structure, the other portions are the same as those in the canister 13.

By using this canister 13a, the gaseous fuel is so distributed by means of the plural outlet holes 19b as to be able to substantially equally flow into the whole layers of absorbent 14 from bottom to top, and therefore the efficiency of absorption into the absorbent 14 is enhanced as compared with the example of FIG. 1 in which the gaseous fuel is allowed to flow in only from the end 19a of the suction passage 19, thereby making it possible to prevent the gaseous fuel from leaking out to the open air more than ever.

A throttle 26 provided in the suction passage 19 shown in FIGS. 1, 2 is used to regulate the time required for the gaseous fuel to be absorbed in the canister 13, 13a.

In the above examples, the canisters 13, 13a are used as the gaseous fuel storing portion, but the canisters 13, 13a may be substituted with a surge tank, in which case, after closing the fuel shut-off valve 6, the gaseous fuel from the fuel feed passage 2a is stored in the surge tank to reduce the pressure in the fuel feed passage 2a, thereby preventing the gaseous fuel from leaking out of the gaseous fuel injection valve 8 attributed to its high pressure. Further, the check valve 24 may be substituted with a solenoid valve, in which case the solenoid valve is controlled by the control unit 25 so as to be opened and closed in the same manner as described above.

As has been described above, according to the present invention, after the engine is stopped and thus the fuel shut-off valve is closed, the gaseous fuel remaining in the fuel feed passage including the fuel distributing pipe can be prevented from leaking out of the gaseous fuel injection valve into the intake manifold and hence from being discharged to the open air.

Furthermore, when the gaseous fuel injection valve is closed, it is not affected by the high-pressure gaseous fuel, and therefore the accuracy with which the gaseous fuel injection valve is closed may not be required to be so high, thereby making it easy to manufacture the gaseous fuel injection valve.

What is claimed is:

1. A fuel discharge preventive device of a gas engine, in which a fuel shut-off valve is provided in a fuel feed passage through which gaseous fuel is fed to a gaseous fuel injection valve, and a suction passage is branched off from said fuel feed passage between said gaseous fuel injection valve and said fuel shut-off valve so as to communicate with a gaseous fuel storing portion, so that gaseous fuel in a portion of the fuel feed passage located between said gaseous fuel injection valve and said fuel shut-off valve is stored in said gaseous fuel storing portion when said fuel shut-off valve is closed, while said stored fuel is purged to an engine when said fuel shut-off valve is opened.

2. A fuel discharge preventive device of a gas engine, comprising: a fuel shut-off valve provided in a fuel feed passage through which gaseous fuel is fed to a gaseous fuel injection valve; a suction passage branched off from said fuel feed passage between said gaseous fuel injection valve and said fuel shut-off valve; a gaseous fuel storing portion provided at another end of said suction passage; a first switch valve provided in said suction passage; a purge passage through which fuel in said gaseous fuel storing portion is purged to an engine; a second switch valve provided in said purge passage; and control means for controlling opening and closing of said fuel shut-off valve, said first switch valve and said second switch valve in connection with opening and closing of said fuel shut-off valve.

3. A device according to either one of claims 1 and 2, wherein said gaseous fuel storing potion comprises a canister or a surge tank.

* * * * *

UNITED STATES PATENT AND TRADEMARK OFFICE
CERTIFICATE OF CORRECTION

PATENT NO. :5,755,210
DATED :May 26, 1998
INVENTOR(s) :SATO et al.

It is certified that error appears in the above-identified patent and that said Letters Patent is hereby corrected as shown below:

ON THE TITLE PAGE, item

--[30] Foreign Application Priority Data

May 27, 1996 [JP] Japan............ 8-131653--

Signed and Sealed this

Twenty-eighth Day of November, 2000

Attest:

Attesting Officer

Q. TODD DICKINSON

Director of Patents and Trademarks